United States Patent [19]

Anderson et al.

[11] Patent Number: 4,498,573
[45] Date of Patent: Feb. 12, 1985

[54] PAIL PALLETIZER WITH ROTATABLE CLAMPS

[75] Inventors: Larry A. Anderson; Charles H. Shultz, both of Vancouver, Wash.

[73] Assignee: Columbia Machine, Inc., Vancouver, Wash.

[21] Appl. No.: 139,234

[22] Filed: Apr. 11, 1980

[51] Int. Cl.³ .............................................. B65G 47/24
[52] U.S. Cl. ..................... 198/374; 198/375; 198/486; 53/149; 53/544; 294/87 R; 294/116; 414/59
[58] Field of Search ............... 198/374, 375, 420, 434, 198/486, 379, 419, 430; 294/87 R; 414/59, 71; 53/149, 543, 544

[56] References Cited

U.S. PATENT DOCUMENTS

| 3,731,785 | 5/1973 | Stuart | 198/419 |
| 3,939,993 | 2/1976 | Lingl | 198/379 |
| 4,119,211 | 10/1978 | Boyer et al. | 198/432 |
| 4,316,693 | 2/1982 | Baxter et al. | 414/59 |

FOREIGN PATENT DOCUMENTS

191389 3/1967 U.S.S.R. .

Primary Examiner—Joseph E. Valenza
Attorney, Agent, or Firm—Kolisch, Hartwell Dickinson & Anderson

[57] ABSTRACT

A method and apparatus for transferring articles, such as pails, from a first station to a second station so that the articles may be loaded at the second station in a preselected spaced-saving array includes a transfer carriage operable for selective shifting along a path between the first and second stations and a gripping device utilizing clamps mounted on the transfer carriage operable for selectively gripping and releasing the articles. An orienting device is operatively associated with the gripping device and is operable for selectively imparting rotation thereto so that the articles may be loaded in a nested array.

10 Claims, 13 Drawing Figures

PAIL PALLETIZER WITH ROTATABLE CLAMPS

BACKGROUND AND SUMMARY OF THE INVENTION

The present invention relates to apparatus for transferring containers, such as cylindrical drums or pails from a receiving station to a loading station and for arranging the pails at the loading station in a predetermined array. Such apparatus are generally known as "palletizers" because the pails are subsequently placed on pallets, and the present invention is directed to a novel method and apparatus for arranging the pails in preselected space-saving arrays.

Exemplary palletizing apparatus are disclosed in U.S. Pat. No. 3,902,594 entitled "Apparatus for Arranging and Stacking Containers" and a co-pending application of applicants' assignee entitled "Variable Array Can Palletizer", Ser. No. 017,179, filed on Mar. 5, 1979; now U.S. Pat. No. 4,316,693. Each of these palletizers includes a carriage which is rectilinearily shiftable on a frame structure between a receiving station and a stacking or loading station. The carriage includes gripping devices which comprise a plurality of clamping arms operable for clamping onto the rim of a drum or pail so that a plurality of pails may be lifted from the receiving station, shifted toward the loading station and deposited thereon. The carriage is then returned, and a new row of pails may be positioned adjacent the first row of the pails.

With respect to the U.S. Pat. No. 3,902,594, the apparatus disclosed therein only provides that adjacent rows are aligned with the center lines of the pails lying along generally parallel lines. With respect to the co-pending application, it is possible to utilize the apparatus disclosed therein for nesting pails so that adjacent rows define either equilateral triangles between the central axes of adjacent pails in the rows or nesting whereby isosceles triangles may be provided.

However, a significant problem exists in loading pails of predetermined diameters onto pallets if the pallets are required to be subsequently loaded into a space having predetermined minimal dimensions. For instance, paint and other materials are often contained within cylindrical containers or pails having lids which have diameters of twelve inches. Most standard tractor-trailer rigs have trailers with outside-to-outside width dimensions of eight feet or 96 inches. However, the thickness of the trailer walls make the inside width of a trailer something less than 96 inches, say 90 inches. Thus, it can be appreciated that if it is desired to load pails having twelve inch diameter lids into such a trailer, a total of eight twelve inch pails may not be positioned with their center lines lying on a common line across the inside width of the trailer. It becomes necessary to nest the pails in rows so that between at least a pair of the rows, the center axes of adjacent pails in the rows define equilateral triangles. In this manner, it may be possible to load pallets, as in rows of four with at least a pair of the rows being nested on each pallet so that a pair of side-by-side positioned pallets may be loaded into the trailer and include a total of eight rows with the above-described nesting of the pails. At least two of the rows, on each pallet, will have their center lines of adjacent pails substantially parallel.

Thus, it becomes necessary to provide an apparatus which will permit stacking or loading of pails on a pallet or other support in which a pair of rows may be nested, as described above, and separate rows may be provided with the center lines of the pails substantially parallel. Prior art palletizing apparatus, such as described in the U.S. Pat. No. 3,902,594 and the co-pending application do not enable nesting of rows followed by rows in which the center lines of the pails lie on parallel lines. This is because each of the above prior art apparatus utilize clamping jaws or arms for engaging and gripping a pail. A total of three clamping arms are used for gripping the lid of a pail with the arms being angularly disposed about a central axis relative to one another at, for instance, 90°, 135° and 135°. It is necessary to provide at least three clamping arms per pail in order to adequately grip and lift a pail. However, it can be readily appreciated that if a row, of say four pails are picked up by associated clamping arms and shifted to an aligned first row, it will be impossible to place a second aligned row adjacent the first aligned row because the clamping jaws will be interposed between the first and second row. It is necessary to provide some type of rotation to the clamping jaws so that the jaws do not interfere with placement of the second row against the first row.

Accordingly, it is a general object of the present invention to provide a method and apparatus for transferring an article or articles, such as pails, from a first station to a second station so that the articles may be loaded at the second station in a preselected space-saving array which includes a carriage operable for selective shifting along a path between the first and second stations and a gripping device mounted on the carriage operable for selectively gripping and releasing the articles in which an orienting means is connected to the gripping means operable for selectively imparting rotation thereto.

Another object of the present invention is to provide an apparatus, as described above, in which the carriage means also includes first and second subcarriages. The first subcarriage is mounted on the carriage means and is operable for selective and reciprocal shifting in a substantially vertical direction relative to the carriage means. The second subcarriage is mounted on the first subcarriage for carrying the gripping means and also includes shifting means for selectively shifting the second subcarriage relative to the first subcarriage. Thus, assuming that a row of pails are disposed at the first station, the first carriage means is shifted to a position thereabove and the second subcarriage is suitably disposed with each of the clamping means above an associated pail. The first subcarriage is then downwardly shifted until the clamping means engage the pails for clamping action and then is shifted vertically upwardly to remove the pails from the loading station. The carriage means is then horizontally shifted until it is disposed above the first station.

The pails are then deposited in a first row and the carriage means is shifted to pick up a second row. A second row is picked up and during shifting toward the second station by the carriage means, the second subcarriage is shifted along the first subcarriage so that the pails of the second row may be nested against the pails of the first row so that the center line of the pails in adjacent rows are disposed at an angle relative to each other. Then, when the carriage means is returned to the first station, the orienting means is operated to rotate so that when pails of a third row are picked up at the first station, they may be subsequently transported to the second station so that they are aligned against the second row so that the second and third rows have the pail center lines parallel to one another.

These and additional objects and advantages of the present invention will be more clearly understood after a consideration of the drawings and the detailed description of the preferred embodiment.

DETAILED DESCRIPTION OF THE PREFERRED EMBODIMENTS

Figure 1:
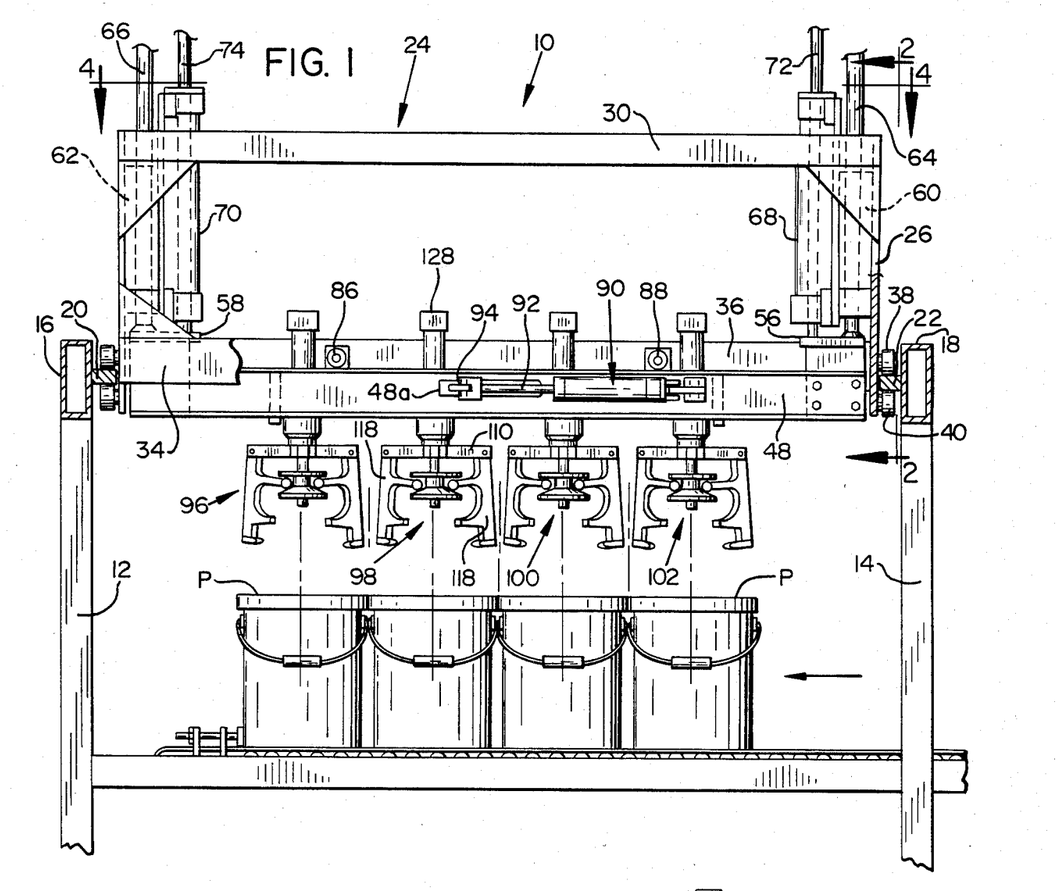
FIG. 1 is a side elevation view of an apparatus according to the present invention illustrating four pails positioned at a first or receiving station about to be picked up by associated gripping means and transferred to a second station.

Turning now to the drawings, attention is initially directed to FIG. 1 which discloses, in side elevational view, an apparatus generally indicated at 10 according to the present invention. The apparatus includes a frame means including opposed spaced-apart uprights 12, 14 behind each of which there are provided additional uprights for interconnecting longitudinally extending beams 16, 18. Mounted on beams 16, 18 are tracks or rails 20, 22 for mounting a carriage means or transfer carriage generally indicated at 24. The transfer carriage is also shown in FIG. 4 in top plan view.

Figure 2:
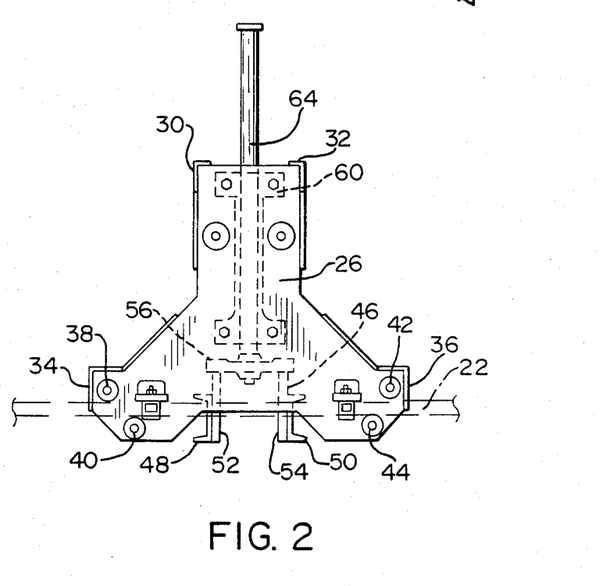
FIG. 2 is a view taken along lines 2—2 of FIG. 1 and shows an end portion of a transfer carriage.
Figure 4:
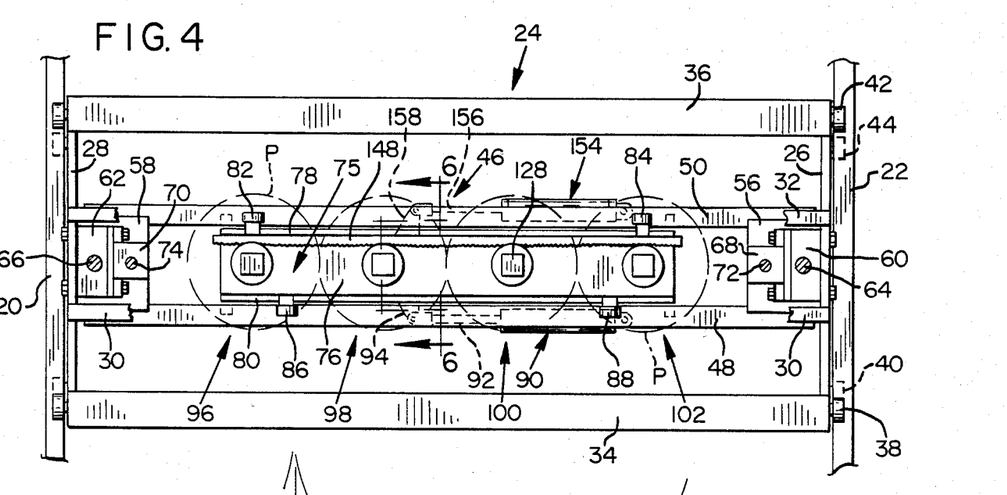
FIG. 4 is a top plan view of the apparatus taken along lines 4—4 of FIG. 1.

Considering details of transfer carriage 24, it can be seen from a viewing of FIGS. 1 and 4 that it includes a frame construction having opposed upright end plates 26, 28 bridged together by upper members 30, 32 as shown in FIG. 4. Lower interconnecting members are shown in FIG. 1 at 34, 36. With reference directed to FIG. 2, it can be seen that each of the end plates, such as end plate 26 shown, include spaced-apart rollers for engaging an associated rail. For instance, as shown in FIG. 2, rollers 38, 40 are spaced apart and engage upper and lower surfaces of rail 22 respectively. Similarly, rollers 42, 44 at the right end of end plate 26 engage upper and lower surfaces, respectively of rail 22. Similarly, rollers are provided on end plate 28 and a suitable actuating mechanism (not shown) is operable for selectively shifting transfer carriage 24 along the rails in a generally horizontal path.

As shown in FIG. 4, a first subcarriage generally indicated at 46 is mounted on transfer carriage 24 and is operable for selective and reciprocal shifting in a substantially vertical direction relative to the transfer carriage. More particularly, the first subcarriage includes a pair of spaced-apart and transversely extending beams such as channel members 48, 50 shown in FIGS. 2 and 4. The channel members are provided for mounting a second subcarriage, which will be described later. As mentioned previously, first subcarriage 46 is mounted on transfer carriage 24 so that it may be shifted in a substantially vertical direction. To this end, each of channel members 48, 50 are provided adjacent their opposite ends with a pair of plates, such as shown in FIG. 2 at 52, 54 rigidly secured to channel members 48, 50 respectively. A mounting plate such as indicated at 56 interconnects plates 52, 54 as shown. Similarly, a mounting plate 58 is shown at the left of FIGS. 1 and 4.

Viewing FIGS. 1 and 4, it can be seen that a pair of opposed guide sleeves such as indicated at 60, 62 are secured to end plates 26, 28, respectively. Guide rod, such as indicated at 64, 66 are slidably received in guide sleeve 60, 62, respectively. An end of the rods is secured to the first subcarriage. For instance, as shown in FIG. 2, guide rod 64 is secured at its lower end by suitable means to mounting plate 56. Similarly, guide rod 66 is suitably secured at its lower end to mounting plate 58.

With respect to providing reciprocal vertical shifting of first subcarriage 46, a pair of fluid powered cylinders, such as indicated at 68, 70 are mounted to guide sleeves 60, 62, respectively. Thus, cylinders 68, 70 are rigidly mounted on transfer carriage 24. Each of the cylinders is operable for extending and retracting a rod, such as rods 72, 74. Each of the rods is suitably secured to first subcarriage 46, i.e., rod 72 has its lower end connected to mounting plate 56 and rod 74 has its lower end connected to mounting plate 58. While not specifically shown, each of the cylinders 68, 70 is connected to a suitable fluid power source and controlled so that their associated rods will be synchronously extended or retracted in a vertical direction during a loading sequence of articles in a manner which will be described.

Turning now to additional structural features of the present invention, it will be noted from a consideration of FIG. 4 that a second subcarriage, generally indicated at 75 is mounted on first subcarriage 46 for shifting, in a direction paralleling channel members 48, 50 of the first subcarriage. More particularly, the second subcarriage includes an elongate, substantially flat support plate 76 provided with opposed upstanding walls 78, 80. Each of the upstanding walls is provided with roller means so that the second subcarriage is operable for rolling or shifting along first subcarriage 46. More particularly, it can be seen that wall 78 is provided with rollers 82, 84 which ride along the upper surface of channel member 50. Similarly, wall 80 is provided with rollers 86, 88 for riding along the upper surface of channel member 48.

The second subcarriage is shiftable, relative to the first subcarriage by means of a shifting means generally indicated at 90. Shifting means 90 includes a fluid powered cylinder arranged for extending and retracting a rod 92. An end of the rod is connected to a lug 94 which extends through an elongate opening 48a provided in channel member 48. Lug 94 is suitably secured to upstanding wall 80 of second carriage 75. Thus, upon extension and retraction of rod 92, second subcarriage 75 will be reciprocally shifted relative to first subcarriage 46.

The second subcarriage also supports a plurality of gripping means such as indicated at 96, 98, 100 and 102 shown in FIG. 1. Four such gripping means are exemplary, but, of course, it is realized that any predetermined number could be used depending upon the desired number of containers or pails to be placed in an array. Each of the gripping means is substantially identical and operates under the same general conditions, and thus only gripping means 98 will be described in detail. This gripping means is illustrated in cross section in FIG. 6 and attention is now directed to this figure.

Figure 5:
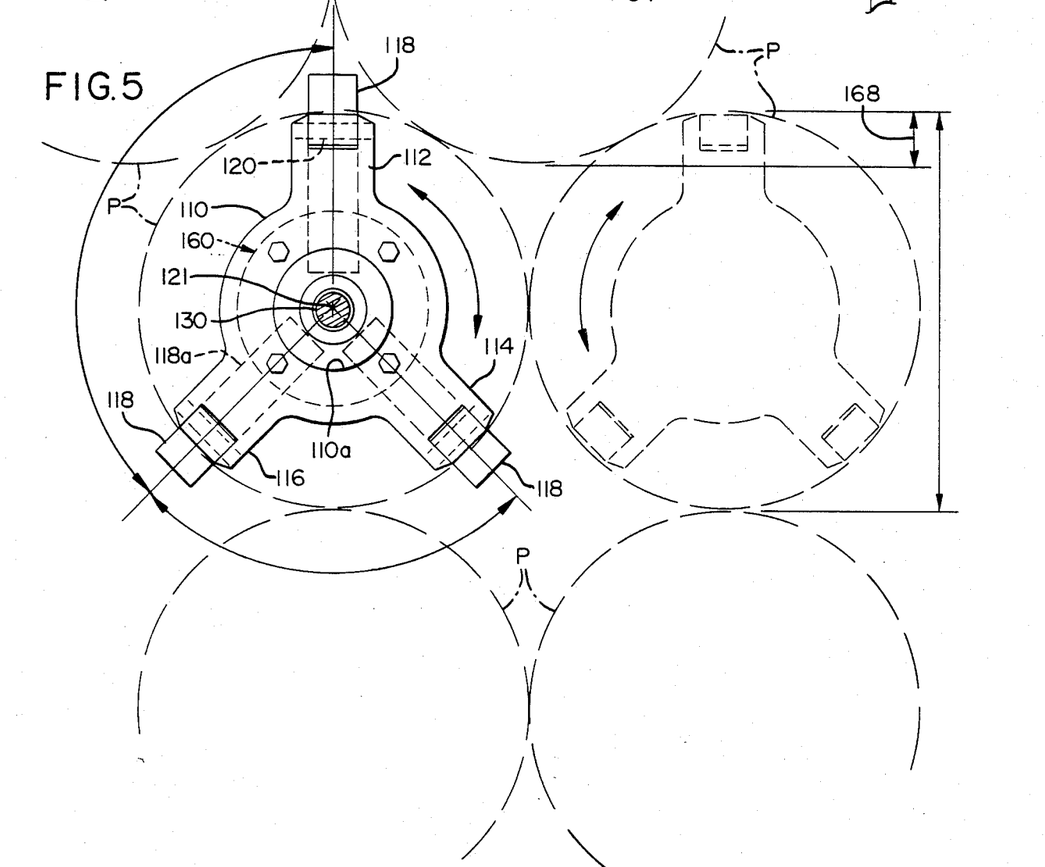
FIG. 5 is an enlarged view of a portion of the gripping means illustrating nesting of pails to provide space savings.
Figures 6, 7:
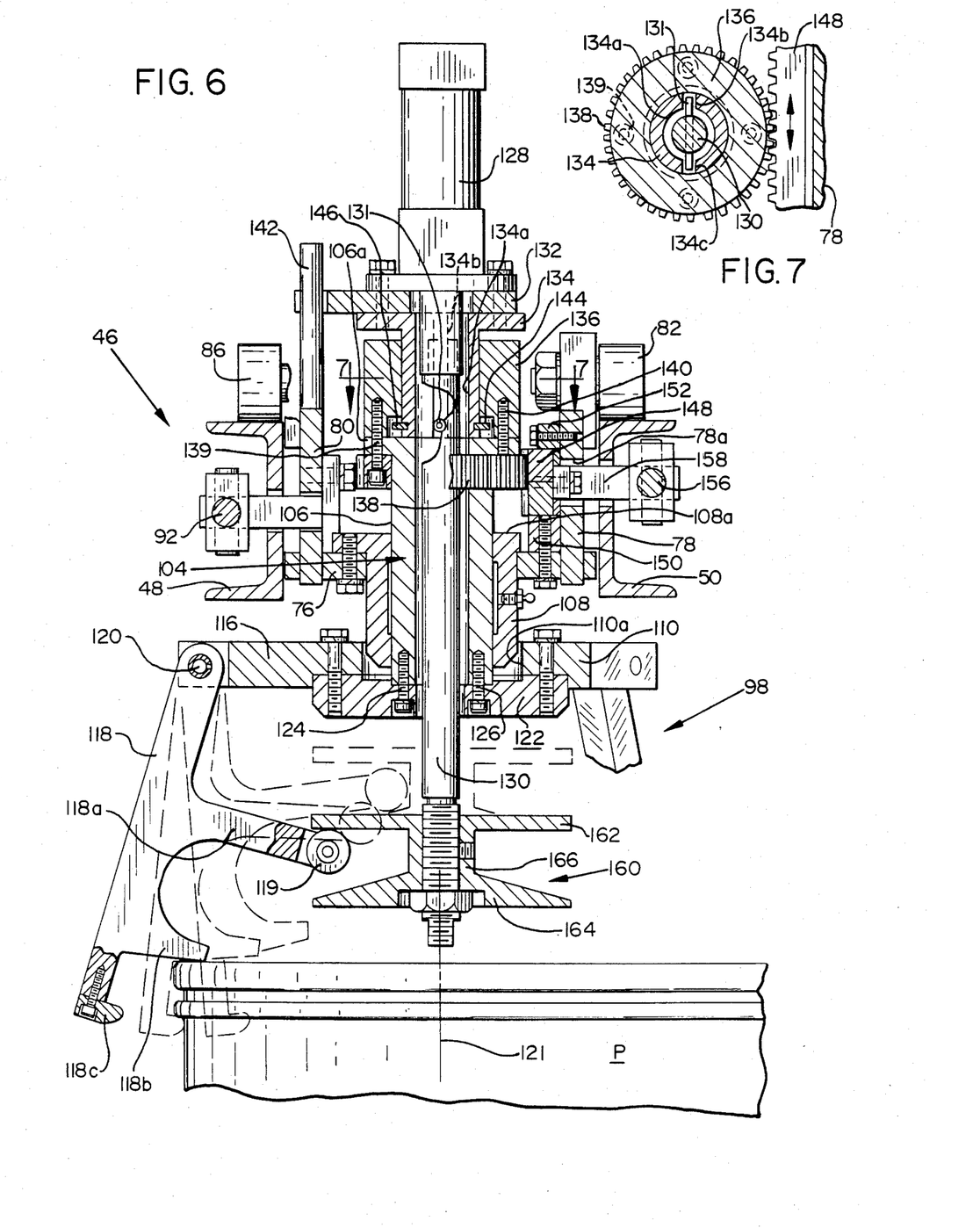
FIG. 6 is a cross-sectional view of the gripping means of the present invention taken along lines 5—5 of FIG. 4 illustrating operation thereof for gripping a pail.
FIG. 7 is a view taken along lines 7—7 of FIG. 6.

Initially, with respect to gripping means 98, it is to be noted that such is provided for selectively gripping and releasing a pail. Mounted on second subcarriage 75 is an orienting means coupled to each of the gripping means, such as gripping means 98, for selectively imparting rotation thereto. More particularly, considering FIG. 6, it can be seen that an orienting means, generally indicated at 104 includes a rotatable sleeve 106 which is rotatably journalled in a cylindrical slide support 108. The slide support is rigidly mounted on support plate 76 and includes a bore extending therethrough for slidably and rotatably receiving sleeve 106. As illustrated, gripping means 98 includes a holder means indicated at 110. Holder means 110 (see FIG. 5 also) includes radially disposed members such as indicated at 112, 114 and 116 which are provided for supporting clamping arms pivotally connected thereto. As shown in FIG. 6, one such clamping arm is indicated at 118 and is pivotally connected to member 116 at 120. The other clamping arms are substantially similar and for purposes of maintaining clarity, are not shown in FIG. 6. Clamping arm 118 includes an extension 118a and spaced-apart pail-engaging projections 118b, 118c. As shown in FIG. 5, each of members 112, 114 and 116 are angularly disposed from one another at a predetermined angle relative to a central axis indicated at 121. More particularly, arm 114 is angularly disposed from arm 116 at 90° and arm 112 is angularly disposed from arm 114 at 135°. Likewise, arm 112 is angularly disposed from arm 116 at 135°.

It is to further be noted that holder means 112 is provided with a mounting plate 122 rigidly connected thereto, which, in turn, is rigidly connected to the bottom of rotatable sleeve 106 by suitable fasteners such as indicated at 124, 126. Holder means 110 includes a central opening 110a for receiving a portion of slide support 108 during a gripping sequence which will be described at a later point.

In order for clamping arms 118 to operate to grip a pail, it is necessary to pivot each about its pivotal connection to holder means 110. To this end, a first actuating means indicated at 128, which preferably takes the form of a fluid-actuated cylinder, is mounted on the second subcarriage for selectively actuating an extendible-retractable rod 130. As shown, first actuating means 128 is mounted on a plate 132 which in turn is mounted on a mounting means or slider 134. Mounted on top of a flange 106a of sleeve 106 is a cylindrical coupling means 136. As shown, coupling means 136 is rigidly connected to sleeve 106. Elaborating further, it is to be noted that a spur gear 138 is concentrically mounted on sleeve 106 beneath flange 106a and is rigidly connected to the sleeve and coupling means 136 by suitable fasteners, such as indicated at 139, 140. With respect to plate 132, it can be seen that an end thereof is slidably connected to an upstanding pin or post indicated at 142. Thus, it can be see that sleeve 106, spur gear 138 and coupling 136 are all rotatable about the longitudinal axis of rod 130 or axis 121. However, slider 134 is nonrotatable and includes means for preventing rod 130 from rotation.

For instance, as shown in FIG. 7, slider 134 is provided with a bore 134a for receiving rod 130. Additionally, slider 134 is provided with radially outwardly extending and opposed slots such as indicated at 134b, 134c. A roll pin, indicated at 131 radially extends from its rigid connection to rod 130 and is slidably received in slots 134b, 134c. The purpose of the roll pin is to prevent inadvertent rotation of rod 130 during an operational sequence which will become apparent at a later point in this description. Turning to an additional feature of coupling means 136, it is noted that a circumferential lower recess 144 is provided for receiving therewithin a ring means such as snap ring 146 circumferentially secured to and radially extending from an outer wall portion of slider 134.

As mentioned previously, an object of the present invention is to rotate gripping means 98, and to this end, a second gear such as an elongate rack, indicated at 148, is slidably mounted adjacent upstanding wall 78 (see also FIG. 4). The rack is suitably mounted for meshing with spur gear 138 and is mounted on a lower slide bearing 150 and retained from vertical shifting by an upper slide bearing 152 mounted on upstanding wall 78. As shown in FIG. 4, a second actuating means, generally indicated at 154 includes a fluid powered cylinder and is connected by means of a rod 156 to a lug 158 which, in turn, is connected to rack 148. An opening 78a of an elongate dimension is provided in upstanding wall 78 for permitting insertion of lug 158 therethrough.

A last structural feature of clamping means 98 resides in the provision of a ring pull, generally indicated at 160 in FIG. 6. More particularly, ring pull 160 includes a pair of concentrically arranged disk-like members 162, 164 interconnected by a central portion 166 which is threadably secured to an end of rod 130. Members 162, 164 are operable, during sequential operation of rod 130, for engaging a roller 119 mounted on extension 118a of clamping arm 118 as well as for engaging similar rollers provided on the remaining two clamping arms.

A description of the operation of gripping means 98 and the novel orienting means of the present invention will now be described with reference to the gripping means shown in FIG. 6. While only the operation of one gripping means will be described, it is to be understood that operation of the other gripping means, such as indicated at 96, 100 and 102 shown in FIG. 1 will be similar. Initially, it is assumed that it is desired to shift a cylindrical container, such as pail P shown in FIG. 6 from a first station to a stacking or discharge station. FIG. 1 illustrates pails initially positioned with their bails substantially similarily oriented (by a device not shown) at a first station beneath each of the gripping means. It is initially taken that transfer carriage 24 is positioned so that each of the gripping means is disposed above and aligned with a pail. The second subcarriage is also oriented so that this alignment occurs. The first subcarriage is disposed above the pails and in this position, top surface of slide support 108 engages the bottom of spur gear 138. First actuating means 128 is actuated (by control means not shown) so that rod 130 is fully extended. In this position, the bottom surface of disk 162 will be urged against roller 119 to cant the clamp arms, such as clamp arm 118 in the outward angular orientation shown in FIG. 6. Next, cylinders 68, 70 are suitably actuated (by control means not shown) to extend rods 72, 74, respectively, vertically downwardly which shifts first subcarriage 46 vertically downwardly until a bottom surface of projections 118b on the clamping arms engage the top of the lid of pail P. The second subcarriage is allowed to shift downwardly a slight distance further to compensate for any slight variations which may exist between the tops of the pails. This downward shifting is shown in FIG. 6 and results in a spacing between top surface 108a of slide support 108 and spur gear 138. Shifting of the spur gear, which is rigidly attached to sleeve 106 is permitted because the rotatable sleeve is slidably mounted in slide support 108. Next, first actuating means 128 is actuated so as to retract rod 130 vertically upwardly while first subcarriage 46 remains substantially stationary. Retraction of rod 130 vertically upwardly results in member 164 contacting roller 119 and pivoting the clamp arms, such as arms 118 in a rotational sense so that a bottom projection 118c of the clamp arm engages a lower portion of the lid of pail P to tightly clamp there against.

Next, first subcarriage 46 is shifted vertically upwardly, by suitable actuation of cylinders 68, 70 and their associated rods so that top surface 108a of sleeve 108 engages the spur gear. After first subcarriage 46 has been raised to a suitable height, thereby raising the pail from the first station transfer carriage 24 is rectilinearly shifted toward the second station so that the pails may be deposited in a row. More particularly, after transfer carriage 24 has been transferred to the second station, first subcarriage 46 is suitably lowered until the bottom of the pails engage the surface of a stacking platform. Rod 130 is then extended by suitable actuation of first actuating means 128 to a position whereby member 162 of ring pull 160 continuously urges the clamping arms, such as clamp arm 118 outwardly until projection 118c is clear of the rim of the pail. Then, first subcarriage 46 may be shifted vertically upwardly and transfer carriage 24 returned to the loading station for picking up another series of pails.

Figure 3:
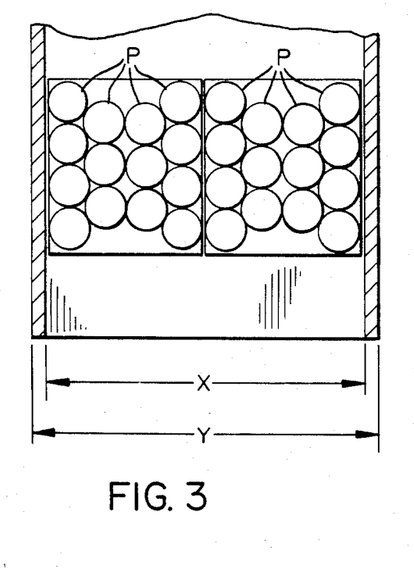
FIG. 3 is a schematic view of an array of pails loaded on a pair of pallets and positioned in the trailers of a truck.
Figures 8, 9:
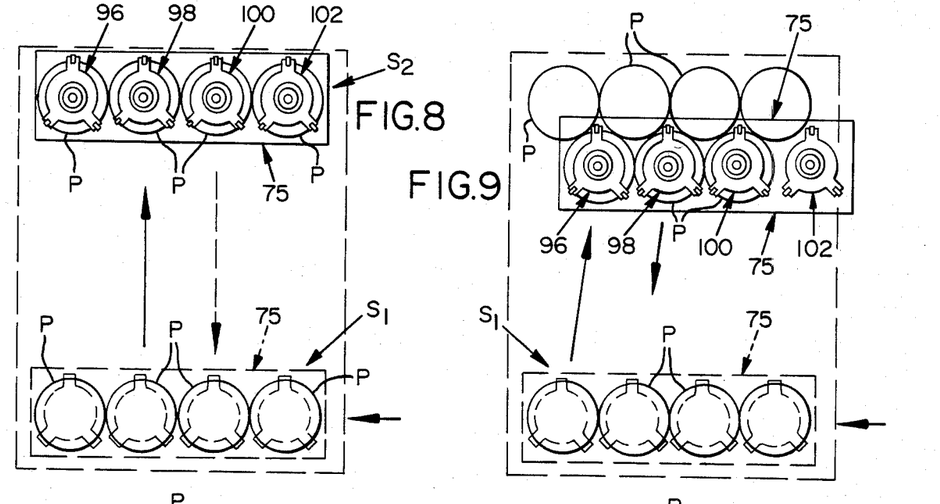
FIGS. 8-13 are a series of diagrammatic views, taken in sequence, illustrating operation of the apparatus of the present invention to load an array of pails so that nested and non-nested rows result in a row configuration of 4-3-3-4 array.

The procedure described above is schematically represented in FIG. 8 and the description will now proceed with reference to creating rows of pails which conform to a preselected array, and more particularly, to an array wherein selected rows of the pails are nested as shown in FIG. 3. Thus, it can be seen from a consideration of FIG. 8 that pails have been shifted from a first station, indicated at $S_1$ by the apparatus of the present invention to a position for unloading at a second station indicated at $S_2$. The gripping means are schematically shown in FIG. 8 and the second subcarriage is indicated at 75. Thus, pails have been moved from the bottom of FIG. 8 for depositing at the top. The transfer carriage is then returned via the dotted line toward station $S_1$ and a new load of pails is picked up. However, because it is desired to nest the second row of pails against the first row, one of the gripping means such as indicated at 102 is not operated (by a suitable control source) so that a pail is not picked up. With gripping means 102 left inoperative, gripping means 96, 98 and 100 are actuated so as to pick up a new load of pails and upon suitable side shifting of second subcarriage 75 (see FIG. 4 and shifting means 90) the pails may be diagonally directed to a position adjacent the first row as shown in FIG. 9. It can be clearly seen that one of the clamping arms of each gripping means fits neatly into an area between adjacent pails in the first row. This can also be appreciated from a consideration of FIG. 5.

Figures 10, 11:
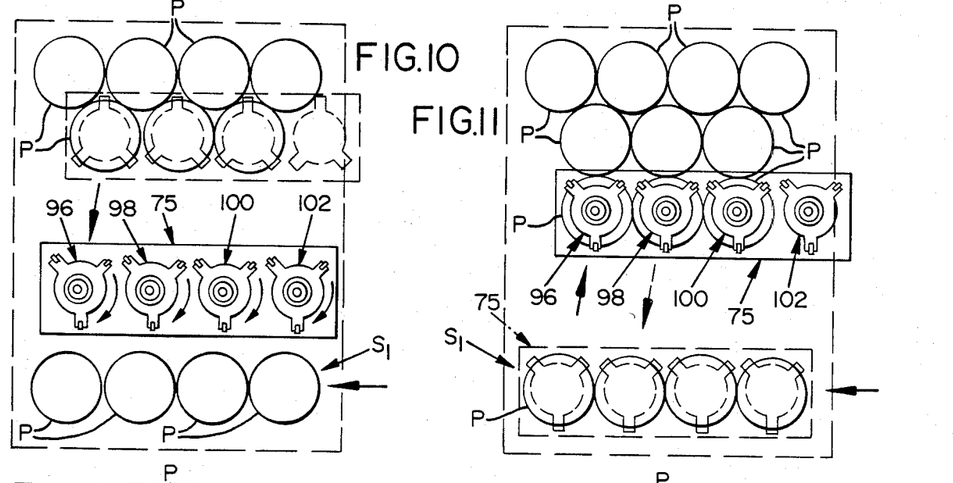

The next step in the sequence contemplates that a third row of three pails will be deposited directly and in line against the second row of three pails with the pails being aligned with their central axis forming squares rather than equilateral triangles. It is now necessary to rotate each gripping means prior to the return of transfer carriage 24 to station $S_1$. This rotation is diagrammatically pictured in FIG. 10 and shows the transfer carriage, and more particularly second subcarriage 75 being shifted toward the left with clockwise rotation of each gripping means. As shown in FIG. 10, each of the gripping means has been rotated 180° and this is accomplished by, and with reference to FIG. 6, actuation of rack 148 by second actuating means 154 (see FIG. 4) so that rotation is imparted to spur gear 138 and sleeve 106. Because the sleeve is rigidly connected to holding means 110, the holding means will correspondingly rotate. With attention still directed to FIG. 6, it can be seen that in order for rotation to occur with the clamping arms of adjacent gripping means not striking each other, it is necessary to retract rod 130, by actuation of first actuating means 128, upwardly into the phantom line designation shown in FIG. 6. As shown in FIG. 6, rotation occurs when the clamping arms are extended radially inwardly so that an outer edge thereof lies inside the outer extremities of holding means 110. This is also shown in FIG. 5, and it is apparent that rollers 119 need a smooth surface on ring pull 160 on which to ride because rod 130 does not rotate. Thus, the tapered surface of member 164 of the ring pole is important to provide this smooth riding surface.

Figures 12, 13:
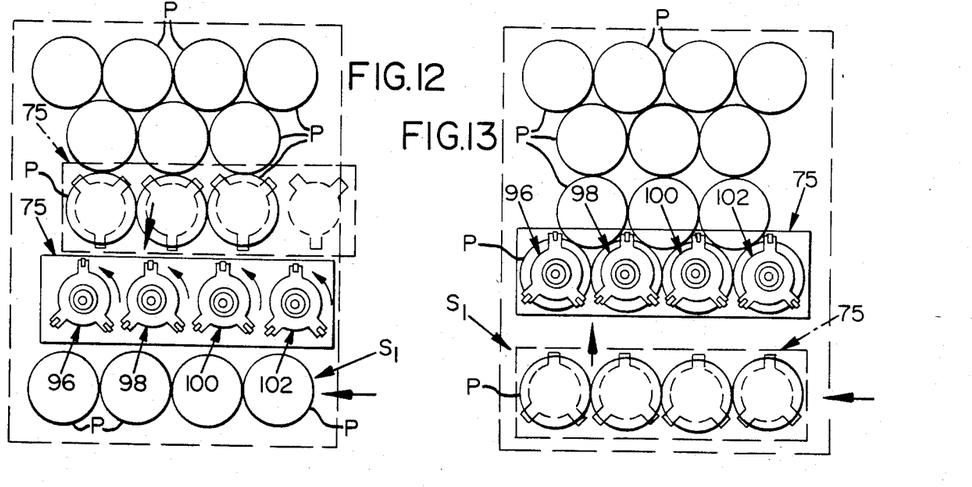

As shown in FIG. 10, the transfer carriage is being returned toward station $S_1$ with each gripping means being suitably rotated 180°. Next, as shown in FIG. 11 (with gripping means 102 not being actuated) a third row of pails are shifted diagonally for placement against the second row of pails with the second and third rows being positioned against one another in a non-nested orientation as pictured. As can be appreciated, with the gripping means being so rotated, the pails may be positioned directly against one another without any interference from the clamping arms. As shown in FIG. 12, it is now necessary to once again provide rotation of 180° to return the gripping means to the original orientation as shown in FIGS. 8 and 9 so that a new row of four pails may be picked up. This is shown in FIG. 12 with rotation being shown by the arrows in FIG. 13 and illustrates final placement of a row of four pails nested neatly against the third row of three pails. What has been provided then is an apparatus and method for selectively nesting rows of cylindrical objects, such as pails, in selected arrays. While an array of 4-3-3-4 has been shown, it can be appreciated that any desired orientation of nested pails, for example, 4-3-4-4, etc., may be provided. The savings in space, by nesting in the manner shown, can be appreciated from a consideration of FIG. 5.

For instance, viewing FIG. 5, it can be seen that a second row is being placed adjacent to an upwardly pictured first row. By providing the nesting, a space savings results, indicated at 168. As mentioned previously, this nesting may only be accomplished if the novel construction of applicant's invention, which includes a laterally shiftable second subcarriage and an orienting means described is provided.

While the present invention has been illustrated and described with reference to the foregoing preferred embodiment, it will be understood by those skilled in the art that other changes in form and detail may be readily made therein without departing from the spirit and scope of the invention as defined in the apended claims.

It is claimed and desired to secure by letters patent:

1. Apparatus for transferring an article from a first station to a second station comprising:

carriage means operable for selective shifting along a path between said first and second stations;

gripping means mounted on said carriage means operable for selectively gripping and releasing the article;

orienting means operably connected to said gripping means for selectively imparting rotation thereto, said orienting means including a rotatable sleeve rotatably mounted on said carriage means;

said gripping means including holder means rigidly mounted on said rotatable sleeve for supporting a plurality of pivotally mounted clamping arms, said gripping means further including first actuating means connected to an extendible-retractable rod slidably received in said rotatable sleeve, one end of said rod being connected to said clamping arms so that when said rod is extended or retracted, said clamping arms are pivoted;

second actuating means mounted on said carriage means operable for selectively imparting rotation to said rotatable sleeve; and mounting means interposed between said first actuating means and said rotatable sleeve, said first actuating means being secured to said mounting means with said mounting means being connected to said carriage means and restrained from rotation relative thereto, said mounting means being provided with retainer means permitting limited rectilinear shifting of said mounting means relative to said rotatable sleeve, said mounting means being provided with a bore for receiving said rod therethrough, said mounting means further including a slot radially extending from the bore, said rod further including pin means radially extending therefrom for slidable reception in the slot so that upon rotation of said rotatable sleeve relative to said mounting means, said rod remains isolated from rotation.

2. The apparatus of claim 1 further including coupling means rigidly mounted on said sleeve, said coupling means including a bore extending therethrough for concentrically and slidably receiving said mounting means, said retainer means including ring means circumferentially secured to said mounting means and extending outwardly therefrom, said coupling means including a circumferential recess for receiving said ring means.

3. The apparatus of claim 2 further including a spur gear concentrically mounted around said rotatable sleeve, said second actuating means being connected to a second gear which meshes with said spur gear so that rotation is imparted to said spur gear and said rotatable sleeve upon operation of said second actuating means.

4. The apparatus of claim 3, wherein said second gear is rectilinearly shiftable by said first actuating means for imparting rotation to said spur gear in a direction substantially perpendicular to the axis of rotation of said spur gear.

5. Apparatus for transferring articles from a first station to a second station comprising:

frame means;

carriage means mounted ons said frame means operable for selective rectilinear shifting along a generally horizontal path on said frame means between said first and second stations;

a plurality of gripping means mounted on said carriage means each being selectively operable for gripping an article when said carriage means is disposed adjacent said first station and holding the article during shifting of said carriage means to said second station for eventual release of the article at said second station;

orienting means coupled to said gripping means operable for selectively imparting rotation to each;

first and second subcarriages, said first subcarriage being mounted on said carriage means operable for selective and reciprocal shifting in a substantially vertical direction relative to said carriage means, said second subcarriage being mounted on said first subcarriage for carrying said gripping means, and shifting means disposed adjacent said carriage means operable for selectively shifting said second subcarriage relative to said first subcarriage generally horizontally and transversely to the direction of shifting of said carriage means;

said orienting means including a plurality of rotatable sleeves each rotatably mounted on said second subcarriage, each of said gripping means including holder means rigidly mounted on an associated rotatable sleeve for supporting a plurality of pivotally mounted clamping arms, each of said gripping means further including first actuating means connected to an extendible-retractable rod slidably received in its associated rotatable sleeve, one end of said rod being connected to said clamping arms so that when said rods are extended or retracted, said clamping arms are pivoted;

second actuating means mounted on said carriage means operable for selectively imparting rotation to each of said rotatable sleeves; and mounting means interposed between each rotatable sleeve and its associated actuating means, said actuating means being secured to said mounting means with said mounting means being connected to said second subcarriage and restrained from rotation relative thereto, said mounting means being provided with retainer means permitting limited rectilinear shifting relative to said rotatable sleeve.

6. The apparatus of claim 5, wherein each of said mounting means is provided with a bore for receiving an associated one of said rods therethrough, each mounting means including a slot radially extending from the bore thereof, each rod further including pin means radially extending therefrom for slidable reception in the slot so that upon rotation of said rotatable sleeves relative to said mounting means, each of said rods remain isolated from rotation.

7. The apparatus of claim 6 further including coupling means rigidly mounted on each of said rotatable sleeves each including a bore extending therethrough for concentrically and slidably receiving an associated mounting means, said retainer means including ring means circumferentially secured to said mounting means and extending outwardly therefrom, said coupling means also including a circumferential recess for receiving said ring means.

8. The apparatus of claim 6, wherein each of said rotatable sleeves is provided with a spur gear concentrically mounted thereon, said second actuating means being connected to a second gear which meshes with each of said spur gears for imparting rotation to each of said rotatable sleeves upon operation of said second actuating means.

9. The apparatus of claim 8, wherein said second gear includes an elongate rack engaging each of said spur gears, said rack being slidably mounted in said second carriage and shiftable in a rectilinear direction generally perpendicularly to the axis of rotation of said rotatable sleeves.

10. The apparatus of claim 9, wherein the end of each extendible-retractable rod is secured to spaced-apart plates, each of said plates being provided for engaging said clamping arms upon extension or retraction of said rod, one of said plates being formed with an upwardly trapering surface.

* * * * *